June 5, 1923.
J. J. COFFEY
1,457,499
DRILL SHANK
Filed March 12, 1921
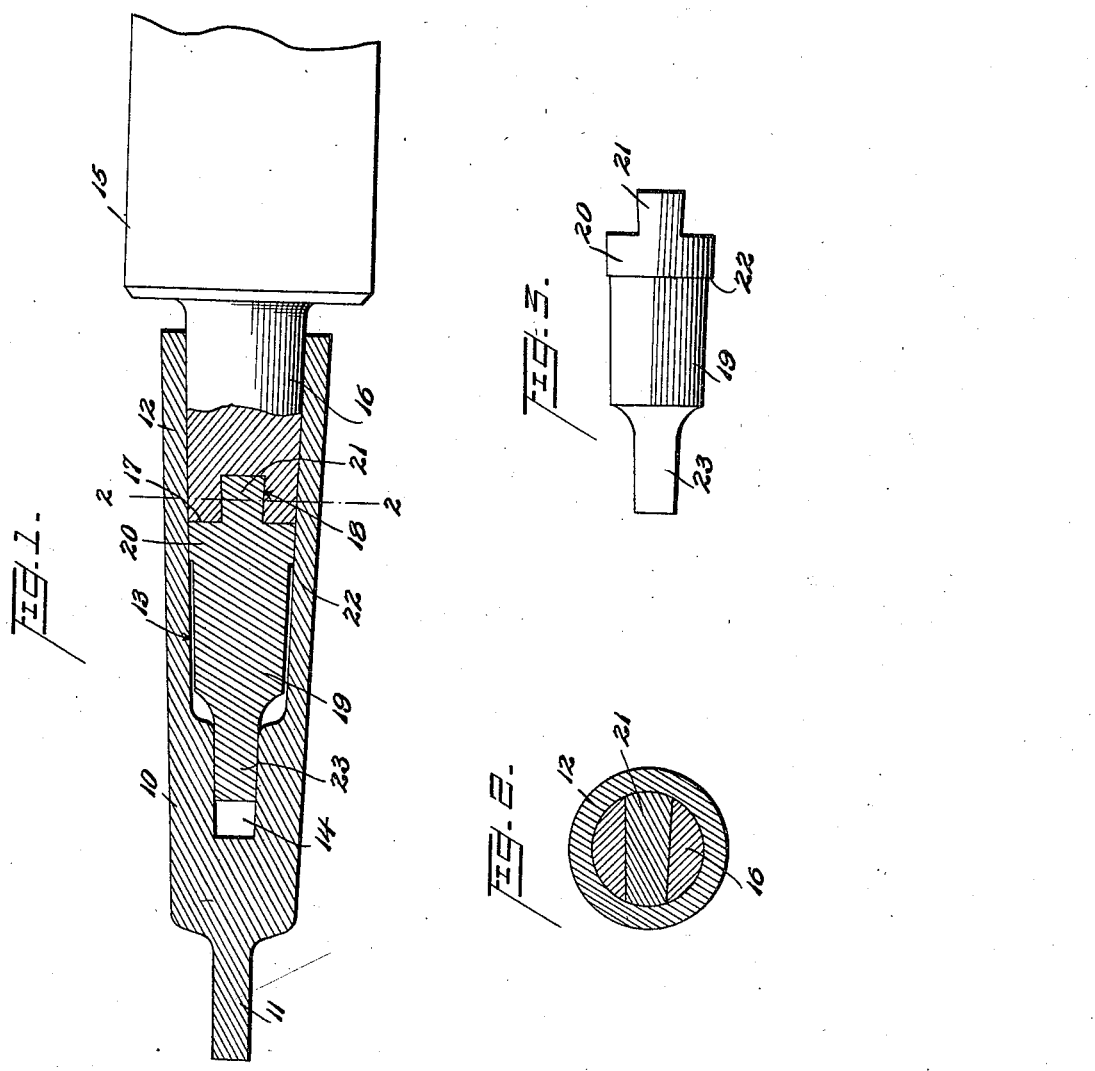
Inventor
J. J. Coffey,
By Watson, Coit, Morse & Grindle,
Att'ys Patented June 5, 1923.

1,457,499

UNITED STATES PATENT OFFICE.

JOHN JAMES COFFEY, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

DRILL SHANK.

Application filed March 12, 1921. Serial No. 451,694.

*To all whom it may concern:*

Be it known that I, JOHN JAMES COFFEY, a citizen of the United States, and residing at Bethlehem, Northampton County, State of Pennsylvania, have invented certain new and useful Improvements in Drill Shanks, of which the following is a specification.

This invention relates to the shanks of drills and similar tools and is designed to prolong the life or effective and useful operation of the drill before repairs are necessary; to lessen the chance for breakage under the strains of use; to confine any breakage which may take place to a detachable member or section instead of an integral part of the shank and to provide a detachable member or section which is of simple construction and which is not only easily applied and removed but is so formed and connected to the other working parts of the drill mechanism as to avoid the development of looseness or the localization of strains on those parts which are most likely to break or give way under the strains of use. As is well known in the art a drill shank is made tapering and in use that shank fits in a tapered collet or sleeve of the driving means and at its upper smaller end is provided with a central transversely extending projecting portion called a tang which enters and fits a correspondingly shaped bearing opening at the base of the tapering socket of the driving collet. This tang prevents relative rotation and also acts as a driver and it has been well recognized in the art for many years that in the usual forms used the strains on it are such that it is the part of the mechanism which in nearly all cases gives way first by breaking or being twisted off. If it is an integral part of the shank the drill must be discarded permanently or at least for a material time until its shank can be repaired or reshaped. Various means have been suggested to overcome or lessen this trouble but without satisfactory results since in most cases some new and unforeseen defect as insufficiently was introduced by the changed structure. The mere provision of a detachable portion of the shank to carry the end tang is not sufficient for several reasons. It does not lessen the strain on the tang and the liability to breakage and at best merely tends to make repair easier if the break occurs on the end tang but at the same time it introduces the possibility of a break where the detachable part joins the main body of the tang and if that break includes an integral part of that main body, the detachable part does not avoid the difficulty. Furthermore if the connection between the detachable part and the main body of the shank is not such as to prevent relative longitudinal movement the main part with its drill is likely to get loose in the sleeve or collet of the driver and drop out as that sleeve is likely to expand somewhat at its lower end in bell shape under the strains of use and thus a new trouble or defect is introduced. According to my invention the parts are so formed and the strains of use so distributed as to not only lessen the strains on the tang where the breakage is most likely to occur but such that if the break occurs at the connection between the detachable part and the main body of the shank it will be in the detachable part and not in the main body thus permitting the continual use of the drill by merely substituting a new detachable part. The structure is furthermore such that looseness of fit between the main body of the shank and its operating sleeve is not likely to develop and even if it should develop the drill will still be held in place for operation and will not drop out. The novel feature of construction by which these new results are secured will be more fully understood from the following description and claims taken in connection with the drawings. In the drawings:

Fig. 1 is a longitudinal section of a drill shank embodying my invention in place in the tapered socket of the driving member;

Fig. 2 is a cross section through the shank on the line 2—2 of Figure 1; and

Fig. 3 is a side elevation of the detachable member alone.

In Figure 1 of the drawing I have shown a driving member 10 of well known form which embodies a tang 11 at its upper end for operative connection with a drilling machine in a well known manner and a sleeve 12 forming a tapering or conical socket 13 to receive the tapered shank of the drill and having beyond the inner end or point of the tapered portion of the socket an extension 14 opening thereinto and having flat sides to receive and engage the tang on the end of the drill shank structure. The drill body 15 (partly broken away in the drawings) has an integral tapered extension 16 circular in cross section forming the main or fixed portion of the drill shank and it is of such size and form as to closely fit in the lower end of the socket 13 but in the form shown extends only to a point about midway of the length of the socket, as shown in Figure 1. Its inner or upper end 17 is cut at right angles to its axis but is provided with a transverse groove 18. This groove is so formed that it is wider at its base than at its top or outlet, its side walls being outwardly inclined from the end surface 17 to the bottom of the groove preferably at an angle of about 2° to the axis of the shank, as illustrated in Figure 1, and its side walls also preferably being at an angle to each other longitudinally making the groove taper transversely of the shank and approximately one-thirty-second inch wider at one end than at the other, as illustrated in Figure 2.

The main features of my invention reside in the structure and arrangement of the detachable member 19 which in use constitutes the inner end of the tapered shank of the drill. It has a conical base or portion 20 at its larger end of such size and shape as to closely and accurately fit the end walls 17 of the main shank portion 16 with its outer surface matching and constituting a continuation of the surface of the main portion 16. It also has transversely thereof at its end a tang or tongue 21 which is transversely and longitudinally tapered at the same angles as the groove 18 and is of such size as to completely fill and closely fit said groove being brought into operative relation therewith by relative side movement of the parts 16 and 19 with the narrower end of the tang entering the wider end of the groove. This gives a wedging action which makes a tight fit with no lost motion and in operation the surrounding sleeve 12 maintains that relation preventing relative side movement. Furthermore the transverse taper of the groove 18 and tang 21 making a dovetail joint secures the parts 16 and 19 together against longitudinal separation and thus there is no possibility that the drill or its shank should separate from the member 19 and drop off through any looseness between it and the sleeve 12 developed by expansion of the sleeve. It will be noted by reference to Figure 1 that while the base portion 20 of the detachable member 19, like the portion 16, closely fits the inner surface of sleeve 12, this is not true of the part between the line 22 and the smaller or upper end of member 19 since throughout all of this portion the surfaces are slightly spaced apart and are out of contact. This is brought about by reducing the diametric measurement or size of the member 19 by a predetermined fixed amount at and beyond the line 22 and thus while the taper continues at the same angle from that line to the tip, there is a uniform annular space left around it within sleeve 12. In other words, the part above line 22 is turned down in forming the shank slightly more than the base portion. This arrangement has the advantage that if or when the outer end of sleeve 12 expands and becomes somewhat bell shaped in use the tapered shank parts may move forward in the socket sufficiently to make a tight fit at the outer end of the socket so as to continue to take some of the strains of use at that point instead of transferring them to and concentrating them on the smaller tip portion of the shank. It not only tends to relieve strains on the tang 23 on the inner end of member 19 fitting in the open extension 14 in the drive member, but also on the tongue and groove connection between the detachable member 19 and the main shank member 16. It thus lessens the chance for breaking or twisting at other points. It should be noted that the drill and its integral shank portion includes no tang which can be broken or twisted and that since the only tangs used in the shank are on the detachable member the breakage will in practically all cases be merely in the detachable member. That makes breakage a much less serious matter since it merely results in a short stop while the broken detachable member is removed and a duplicate new one substituted. The substitution may be made easily and quickly since the form of connection is such that a mere blow of the hammer will loosen it and in the same way a mere blow or application of pressure will drive the new one home.

While I have shown one specific embodiment of my invention it will be understood that it is not confined to that particular form but may include any other embodying those essential elements and features mentioned in the claims.

Having thus described the invention what is claimed as new and desired to be secured by Letters Patent is:

1. A shank for drills comprising a tapered portion integral with the drill adapted to fit in the conical end of the collet or driving member and having in its end a transverse groove of greater width below its top than at the top, and a detachable similarly tapered portion or member having a transverse tang or tongue on its larger end adapted to enter said groove from its end and to closely fit the same and prevent relative rotary or longitudinal movement of the portions and a tang on the smaller end adapted to engage the driving member to prevent turning.

2. A shank for drills comprising a tapered portion integral with the drill adapted to fit in the conical end of the collet or driving member and having in its end a transverse groove of greater width below its top than at the top, and a detachable similarly tapered member having its larger end so shaped as to match and closely fit the end of said integral portion with a tang or tongue closely fitting said groove and a tang on the smaller end the diametric size of said detachable member being reduced a predetermined amount below normal from a transverse line near its larger end to its top whereby above that line it will not in use fit but be spaced from the surrounding conical collet or drive member.

3. An article of manufacture adapted for use as a part of the tapered shank of a drill comprising a tapered body portion abnormally reduced in diametric size a predetermined amount from a transverse plane shortly above the base or larger end to the upper end, a tang at its lower end tapering transversely from its outer end to its base for connecting it to the shank part of a drill and a tang on its upper end for connection to a driving member.

4. A member adapted to constitute when in use the end of a drill shank comprising a tapered body portion of such diametric size from its small end downwardly throughout most of its length that it will be out of contact with the inner surface of a conical driving member or sleeve fitting the shank beyond it, a tang on its smaller end and a tang on the larger end so shaped as to prevent relative rotary or longitudinal movement of any part fitting and engaging it.

5. A member adapted to constitute when in use the end of a drill shank comprising a tapered body portion a tang on its smaller end and a tang or transversely extending tongue on its larger end tapering transversely from its end to its base and tapering longitudinally.

6. A shank for drills comprising a tapered portion integral with the drill adapted to fit in the conical end of the collet or driving member, and a tapered portion adapted to form a detachable extension of said first mentioned portion within the collet having at its smaller end a tang adapted to engage and enter a socket in the driving member to prevent turning, the meeting ends of said portions of the shank having transverse tongue and groove connection so formed as to permit the tongue to enter the groove from one end but to prevent longitudinal separation of the portions when assembled.

7. A shank for drills comprising a tapered portion integral with the drill adapted to fit in the conical end of the collet or driving member and a tapered portion adapted to form a detachable extension of said first mentioned portion within the collet, having at its smaller end a tang adapted to engage and enter a socket in the driving member to prevent turning, the meeting ends of said portions of the shank having transverse tongue and groove connection in which the groove is of greater width below its top than at the top, and the tongue matches and fits the groove transversely and both tongue and groove are tapered correspondingly longitudinally thereof and transversely of the shank portions.

8. A shank for drills comprising a tapered portion integral with the drill adapted to fit in the conical end of the collet or driving member, and a detachable similarly tapered member having its larger end so shaped as to match and closely fit the end of said integral portion and a tang on the smaller end, the diametric size of said detachable member being reduced a predetermined amount below normal from a transverse line near its larger end to its top whereby above that line it will not in use fit but be spaced from the surrounding conical collet or drive member.

9. An article of manufacture adapted for use as a part of the tapered shank of a drill comprising a rigid tapered body portion circular in cross-section abnormally reduced in diametric size a predetermined uniform amount around the periphery from a transverse plane shortly above the base or larger end to the upper end, means at its larger end for connecting it to the shank part of a drill and a tang on and extending beyond its upper end for connection to a driving member.

In testimony whereof I affix my signature.

JOHN JAMES COFFEY.